T. COSSAR.
FLAT BED WEB PRINTING MACHINE.
APPLICATION FILED MAR. 24, 1915.
1,147,707.
Patented July 27, 1915.
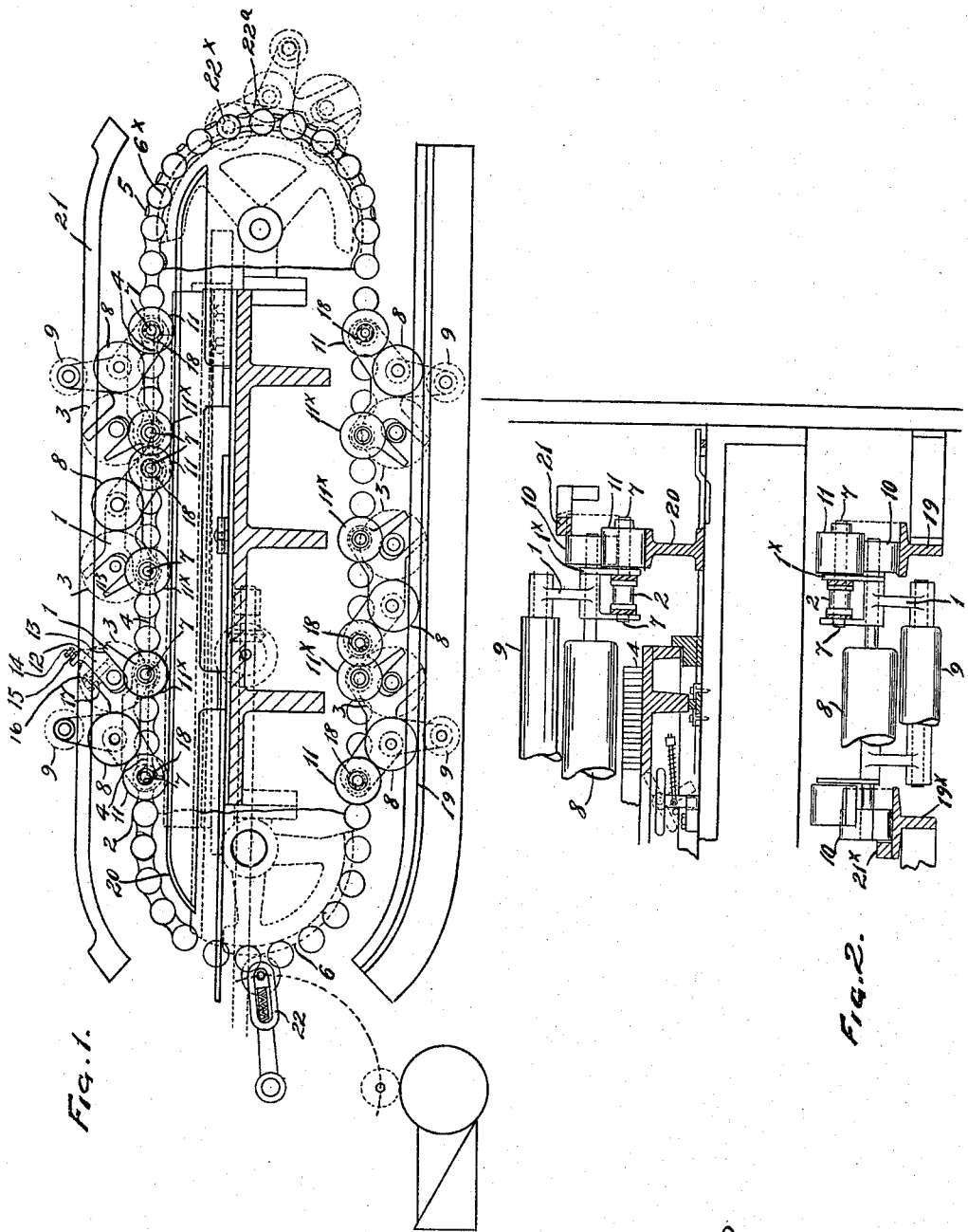

UNITED STATES PATENT OFFICE.

THOMAS COSSAR, OF OTLEY, ENGLAND.

FLAT-BED WEB-PRINTING MACHINE.

1,147,707.             Specification of Letters Patent.     Patented July 27, 1915.

Application filed March 24, 1915. Serial No. 16,748.

*To all whom it may concern:*

Be it known that I, THOMAS COSSAR, a subject of the King of the United Kingdom of Great Britain and Ireland, and residing at Otley, Yorkshire, England, have invented a certain new and useful Improvement in Flat-Bed Web-Printing Machines, of which the following is a specification.

This invention relates to flat-bed web printing machines of the kind wherein the inking rollers, rider rollers and web-supports are carried by endless chains or the like traveling in relation to the form as described for example in the specification of Letters Patent No. 1020190, and contemplates an efficient and simple mounting for the inking rollers, the rider rollers co-acting with the inking rollers and the web-supports on the endless chains; a mounting for the inking rollers such that they can be adjusted to the form and the rider rollers, or raised entirely clear of both when required; means for rotating the rider rollers, said means including rotary members, e. g., bowls or runners on the outer ends of the rider rollers and tracks on which said bowls or runners run when passing underneath the bed, and rotary members, e. g., bowls or runners loosely mounted on extended chain bolts or the like and co-acting with the bowls or runners on the rider rollers, and tracks on which the loosely mounted bowls or runners run when passing over the type bed, or toothed wheels fixed to the rider rollers and meshing either with a stationary rack with internal teeth or toothed wheels loosely mounted on the chain bolts meshing with a stationary rack with external teeth and transmitting motion from the rack to the rider rollers; and means for imparting to said rider rollers endwise reciprocatory movements to promote the distribution of the ink.

Figure 1 of the accompanying drawing is a part side elevation, part vertical section, and Fig. 2 a broken end view of part of a printing machine embodying the invention.

In the construction illustrated, the inking rollers, rider rollers and web-supports are carried by brackets 1 mounted centrally on the chains 2 so that the pull is taken centrally on the chains which are not subjected to lateral pull or torsion, as is understood.

The construction of each of the brackets 1 is such that the part of the periphery of each inking roller 3 in contact with the form 4 is approximately in the same horizontal plane as the center or pitch line of each chain and the mounting of each inking roller 3 is such that its center is approximately directly above the center of one of the bolts on which the bracket 1 carrying the same is journaled so that when rounding the chain wheels 5 at each end the inking roller does not materially alter its position in relation to such pitch line. Accordingly, the surfaces of the curved inking tables 6 and 6$^x$ have approximately the same radius of curvature as such pitch line, and consequently the peripheral speed of the inking rollers varies but slightly in the course of the straight parts of their travel and around the chain wheels at each end, so that, when the inking rollers leave the inking table 6$^x$ at the feeding-in end of the machine, they are rotating at substantially the proper speed for engagement with the form.

Certain of the links of the chains are connected by extended bolts 7 on which are journaled the brackets 1 which span the chains, in which brackets are mounted the spindles of the rider rollers 8 and the web-supports 9.

The mounting of the brackets 1 is such that chains of standard design may be employed, one side plate 1$^x$ of each bracket 1 being strung on a pair of bolts 7 and removably fixed to the rest of the bracket, so that the bracket may be removed if necessary without the necessity for disconnecting any part of its chain.

The inner face of each bracket, i. e., the face next the chain, is shaped to conform more or less to the contour which the chain assumes when rounding a chain wheel, as shown in dotted lines at 22$^a$.

On the spindles at each end of the rider rollers 8 are fixed bowls or runners 10 and on pairs of adjacent bolts 7 carrying the brackets are loosely journaled bowls or runners 11 and 11$^x$.

The spindles of the inking rollers 3 are journaled in bushes 12 which are in turn mounted in slots 13 in the brackets and the inking rollers are adjustable to or from the form and corresponding rider rollers to suit varying diameters of inking rollers or may be raised entirely clear of both by movement of the bushes in the slots. The slots 13 are so inclined that on movement of the bushes the inking rollers are adjusted to the rider rollers and the form at one and the same time. One adjusting screw 14 is fitted in each bush to bear against the end of the bracket 1, the screw coöperating with a locknut 15; a fixing screw 16 passed through a suitably dimensioned slot 17 in each bracket 1 is also threaded into the bush 12. When the inking rollers are in the straight part of their travel above the bed, they may be adjusted to their proper working contact with the form and rider rollers by manipulation of the adjusting screws 14, which manipulation will therefore raise or lower the bushes 12 in the slots 13 and with them the inking rollers. When the proper adjustment is found, the adjusting screws 14 may be locked by the coöperating nuts 15, while the bushes 12 may be locked in position in the slots 13 by tightening up the fixing screws 16.

When desired, the inking rollers may be raised clear of both the form and the rider rollers by loosening the fixing screws 16 and drawing the bushes a short distance up the slots and they may be fixed in their new position free of the form and rider rollers by again tightening up the fixing screws 16. As the adjustment of the adjusting screws 14 is not altered, the inking rollers may be quickly lowered again to the same working position as before by loosening the fixing screws 16 and lowering the bushes 12 in the slots 13 until the point of each adjusting screw 14 again bears against the end of its bracket 1, whereupon the rollers may be locked as before in their proper working position by tightening up the fixing screws 16.

The web-supports 9 hold the web clear of the inking rollers 3, as will be understood.

Each bracket is a good working fit on one of the bolts 7 but has some play on the other bolt of the pair so that the coöperating bowls 10, 11 are free to come into close, that is driving, contact. The orifices in the brackets through which pass the bolts 7 on which the brackets have play are slotted at 18, so that, when the brackets are rounding the chain wheels, the bolts 7 may be free to assume their relatively closer position due to the curvature of the chains around the wheels, as shown at 22ˣ. The slots 18 are each made preferably of the form of a short arc struck from a center on the axis of the rider roller, so that, when the bolt 7 passing through the slot 18 assumes its position relatively closer to the other bolt of the pair when passing around the chain wheels, the axis of the rider roller may be kept substantially at its normal distance from the axis of the bolt 7 and the coöperating bowls 10, 11 may be kept close together, so that on cessation of the action of centrifugal force (which tends to throw the rider rollers outward when passing around the chain wheels) when the brackets enter the straight part of their travel above the bed, the bowls 10, now swung downward, may come into driving contact with the bowls 11 with as little knock or noise as possible.

Fixed to the framework of the machine are stationary rails 19, 19ˣ on which the bowls 10 run when passing along underneath the bed, the rails 19, 19ˣ being preferably formed with upwardly curved ends to insure easy and quiet engagement of the bowls and rails. Also fixed to the framework of the machine are stationary rails 20 on which the bowls 11 and 11ˣ run when passing over the form, said rails 20 being preferably formed with downwardly curved ends to insure easy and quiet engagement and disengagement of the bowls and rails.

The rider rollers, and thereby the inking rollers, are thus driven by contact of the bowls 10 with the rails 19, 19ˣ when passing underneath the type bed and by contact of the bowls 10 with the bowls 11 which in turn contact with the rails 20 when passing over the type bed; the bowls 11ˣ acting to support one end of each bracket 1.

On the rail 19ˣ or other part is fixed a longitudinally inclined guide 21ˣ adapted to engage the bowls 10 edgewise when traveling beneath the bed. Above the bed is an inclined guide 21 engaged edgewise by the bowls 10 when traveling above the bed.

It will be seen that the function of one guide 21ˣ is to move the rider rollers axially in one direction, and the function of the guide 21 is to move the rider rollers axially in the opposite direction. This reciprocation of the rider rollers insures proper distribution of the ink, as is well known.

The inking rollers receive their supply of ink from an ink table at one end of the machine supplied by a swinging ductor 22 or other suitable device, and as they roll along underneath the bed are maintained in continuous rotation in contact with the rider rollers and thus work the ink into a finely divided state ready to be transferred to the formas the inking rollers pass over it. At the opposite end of the machine an auxiliary ink table 6ˣ may be provided to assist in the distribution of the ink and to maintain the inking rollers in rotation as they pass around the chain wheels.

While I have described above an embodiment of the invention in which rotation is transmitted to the rider rollers by frictional contact, with suitable modification the transmission may be effected through the intermediary of toothed gearing, as hereinbefore mentioned.

I claim:—

1. In a flat bed printing machine of the kind described, in combination, a form, endless chains traveling in relation to said form, inking rollers, rider rollers and web-supports, brackets carrying said rollers and web-supports, pairs of bolts on which said brackets are journaled, rotary members loosely journaled on said bolts, rotary members constrained to rotate with said rider rollers, the rotary member on one of each pair of bolts coöperating with a rotary member constrained to rotate with a corresponding rider roller, and stationary tracks engaged by the rotary members on the bolts and by the rotary members rotating with said rider rollers.

2. In a flat bed printing machine of the kind described, in combination, a form, endless chains traveling in relation to said form, inking rollers, rider rollers and web-supports, brackets carrying said rollers and web-supports, said brackets so constucted that the part of the periphery of each inking roller in contact with the form is approximately in the same horizontal plane as the pitch line of each chain, and the mounting of each inking roller in relation to the bracket being such that when rounding a chain wheel it shall not materially alter its position in relation to said pitch line, pairs of bolts on which said brackets are journaled, rotary members loosely journaled on said bolts, rotary members constrained to rotate with said rider rollers, the rotary member on one of each pair of bolts coöperating with a rotary member constrained to rotate with a corresponding rider roller, and stationary tracks engaged by the rotary members on the bolts and by the rotary members rotating with said rider rollers.

3. In a flat bed printing machine of the kind described, in combination, a form, endless chains traveling in relation to said form, inking rollers, rider rollers and web-supports, brackets carrying said rollers and web-supports, pairs of bolts on which said brackets are journaled, each bracket being formed with a slot engaged by one bolt of each pair, said slot being in the form of an arc struck from a center on the axis of a rider roller, rotary members loosely journaled on said bolts, rotary members constrained to rotate with said rider rollers, the rotary member on one of each pair of bolts coöperating with a rotary member constrained to rotate with a corresponding rider roller, and stationary tracks engaged by the rotary members on said bolts and by the rotary members rotating with said rider rollers.

4. In a flat bed printing machine of the kind described, in combination, a form, endless chains traveling in relation to said form, inking rollers, rider rollers and web-supports, brackets carrying said rollers and web-supports, said brackets formed with inclined slots, adjustable bushes mounted in said inclined slots, said bushes receiving the spindles of the inking rollers, pairs of bolts on which said brackets are journaled, rotary members loosely journaled on said bolts, rotary members constrained to rotate with said rider rollers, the rotary member on one of each pair of bolts coöperating with a rotary member constrained to rotate with a corresponding rider roller, and stationary tracks engaged by the rotary members on said bolts and by the rotary members rotating with said rider rollers.

5. In a flat bed printing machine of the kind described, in combination, a form, endless chains traveling in relation to said form, inking rollers, rider rollers and web-supports, brackets carrying said rollers and web-supports, pairs of bolts on which said brackets are journaled, rotary members loosely journaled on said bolts, rotary members constrained to rotate with said rider rollers, the rotary member on one of each pair of bolts coöperating with a rotary member constrained to rotate with a corresponding rider roller, stationary tracks engaged by the rotary members on said bolts and by the rotary members rotating with said rider rollers, and inclined guides disposed longitudinally of said chains and acting to move said rider rollers axially first in one direction and then in the other direction during their travel, substantially as described.

In testimony whereof I have signed my name to this specification in the presence of two subscribing witnesses.

THOMAS COSSAR.

Witnesses:
WALLACE CRANSTON FAIRWEATHER,
HENRY MASON.

Copies of this patent may be obtained for five cents each, by addressing the "Commissioner of Patents. Washington, D. C."